(12) United States Patent
Shimura (10) Patent No.: US 12,214,494 B2
(45) Date of Patent: Feb. 4, 2025

(54) TEACHING SUPPORT DEVICE

(71) Applicant: SEIKO EPSON CORPORATION, Tokyo (JP)

(72) Inventor: Yuma Shimura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 304 days.

(21) Appl. No.: 17/855,944

(22) Filed: Jul. 1, 2022

(65) Prior Publication Data

US 2023/0001567 A1    Jan. 5, 2023

(30) Foreign Application Priority Data

Jul. 2, 2021    (JP) ................................. 2021-110837

(51) Int. Cl.
| | | |
|---|---|---|
| *B24B 51/00* | (2006.01) | |
| *B25J 9/00* | (2006.01) | |
| *B25J 9/16* | (2006.01) | |
| *B25J 11/00* | (2006.01) | |
| *G05B 19/409* | (2006.01) | |

(52) U.S. Cl.
CPC ........... *B25J 9/0081* (2013.01); *B25J 9/1633* (2013.01); *B25J 9/1689* (2013.01); *B25J 11/0065* (2013.01)

(58) Field of Classification Search
CPC ...... B25J 9/0081; B25J 9/1633; B25J 9/1689; B25J 11/0065; B25J 9/1656; B25J 9/1605; B25J 9/1669; G05B 2219/36162; G05B 2219/39438; G05B 2219/39443; G05B 2219/45096; G05B 19/409; B24B 51/00

See application file for complete search history.

(56) References Cited

U.S. PATENT DOCUMENTS

| | | | |
|---|---|---|---|
| 2013/0311154 A1* | 11/2013 | Atohira | G06T 13/20 |
| | | | 703/6 |
| 2016/0354933 A1* | 12/2016 | Sato | B25J 9/1633 |
| 2020/0009705 A1* | 1/2020 | Manabe | B25J 13/08 |
| 2021/0053218 A1 | 2/2021 | Satou | |
| 2021/0331287 A1* | 10/2021 | Lo | G05B 13/04 |
| 2022/0126319 A1* | 4/2022 | Richardson | B24B 21/006 |
| 2022/0410343 A1* | 12/2022 | Ishibashi | B08B 3/02 |

FOREIGN PATENT DOCUMENTS

| | | |
|---|---|---|
| JP | H06-262563 A | 9/1994 |
| JP | 2021-030364 A | 3/2021 |

\* cited by examiner

*Primary Examiner* — Adam R Mott
*Assistant Examiner* — Heather J Keniry
(74) *Attorney, Agent, or Firm* — Harness, Dickey & Pierce, P.L.C.

(57) ABSTRACT

A teaching support device configured to perform teaching to a robot which has a robot arm a tip of which is attached with a polishing tool, and which controls the robot arm with force control to perform a polishing task on an object includes a teaching point acquisition section configured to obtain information related to a plurality of teaching points set to the object, a polishing parameter acquisition section configured to obtain information related to a polishing parameter of the polishing task at the plurality of teaching points obtained by the teaching point acquisition section, and a display control section configured to display the teaching point out of the plurality of teaching points with a color based on the polishing parameter obtained by the polishing parameter acquisition section so as to overlap the object.

7 Claims, 8 Drawing Sheets

TEACHING SUPPORT DEVICE

The present application is based on, and claims priority from JP Application Serial Number 2021-110837, filed Jul. 2, 2021, the disclosure of which is hereby incorporated by reference herein in its entirety.

BACKGROUND

1. Technical Field

The present disclosure relates to a teaching support device.

2. Related Art

There has been known a robot which performs force control using a force sensor provided to a robot arm. There is disclosed a teaching support device which performs teaching of task information to such a robot as shown in, for example, JP-A-6-262563 (Document 1) in advance of the robot performing a task. In the teaching support device described in Document 1, there is known a device which displays the force applied to a task object to thereby perform the support of the teaching when performing the teaching. In the device which performs the support of the teaching, teaching information such as a target force is set for every teaching point which is taught to the task object.

However, in the related-art method, it is difficult to figure out the teaching information at the plurality of teaching points set to the task object at a glance.

SUMMARY

A teaching support device according to the present disclosure is a teaching support device configured to perform teaching to a robot which has a robot arm a tip of which is attached with a polishing tool, and which controls the robot arm with force control to perform a polishing task on an object, the teaching support device including a teaching point acquisition section configured to obtain information related to a plurality of teaching points set to the object, a polishing parameter acquisition section configured to obtain information related to a polishing parameter of the polishing task at the plurality of teaching points obtained by the teaching point acquisition section, and a display control section configured to display the teaching point out of the plurality of teaching points with a color based on the polishing parameter obtained by the polishing parameter acquisition section so as to overlap the object.

DESCRIPTION OF AN EXEMPLARY EMBODIMENT

Embodiment

Figure 1:
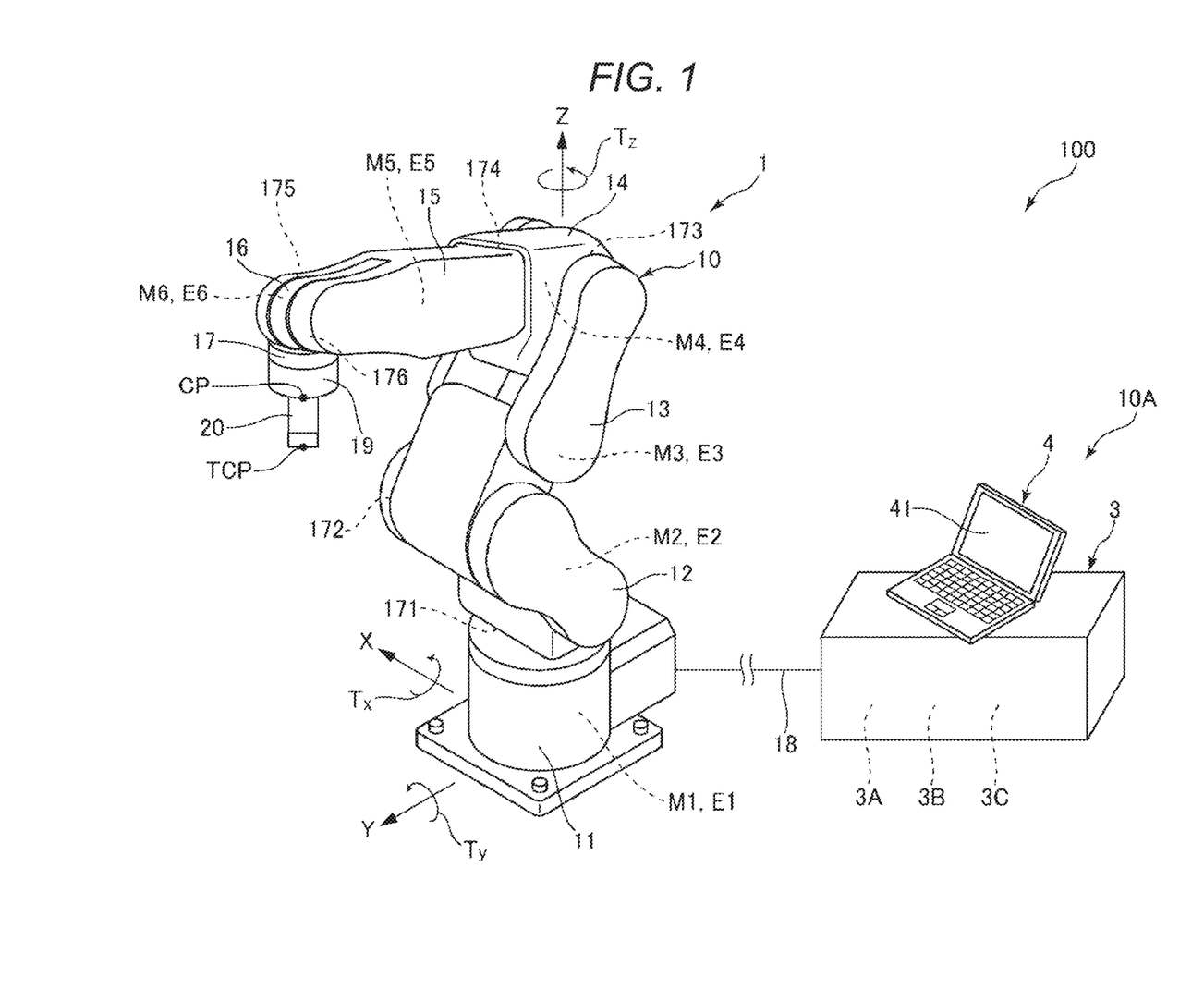
FIG. 1 is a diagram showing an overall configuration of a robotic system equipped with a teaching support device according to the present disclosure.
Figure 2:
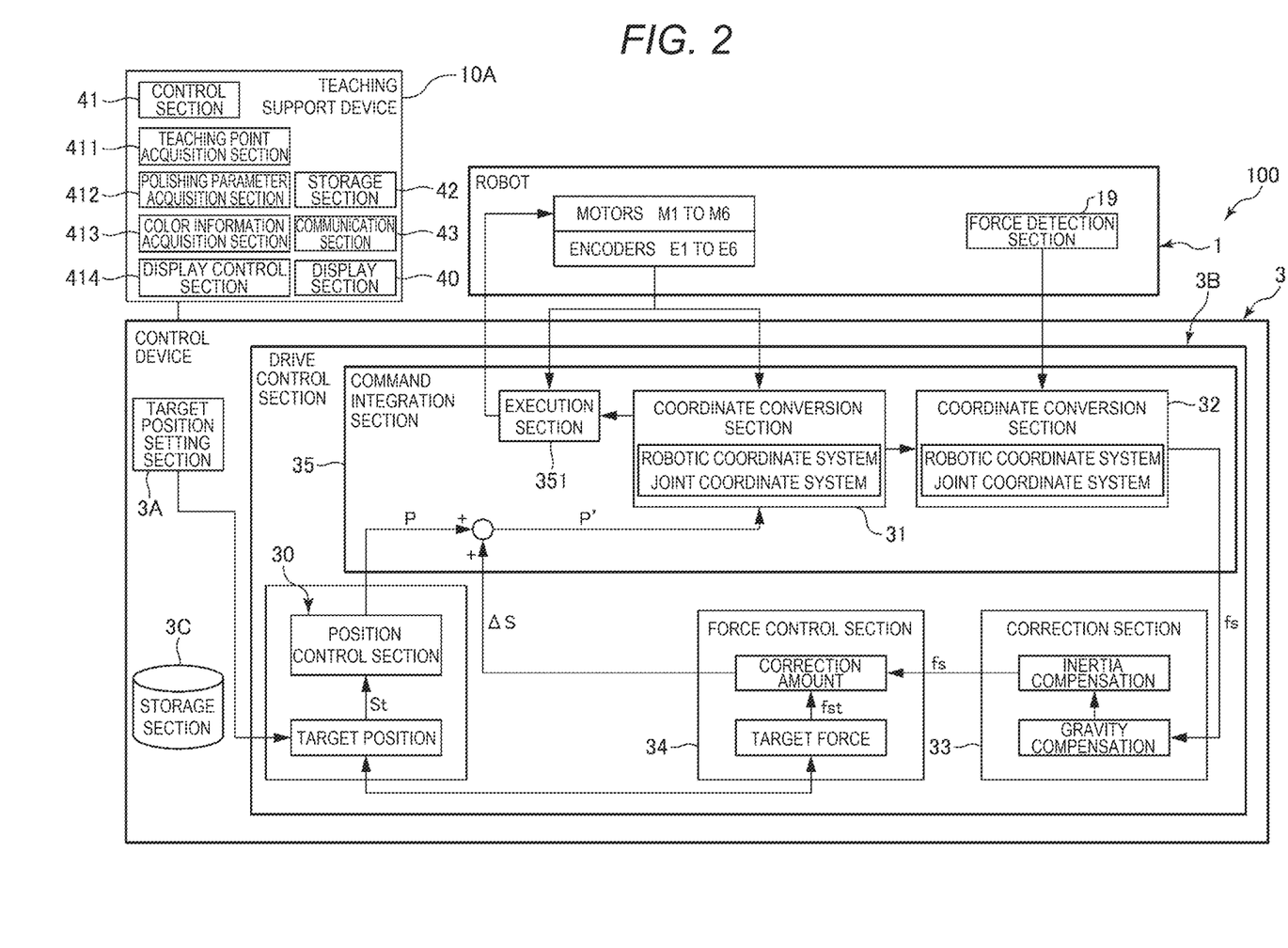
FIG. 2 is a block diagram of the robotic system shown in FIG. 1.
Figure 3:
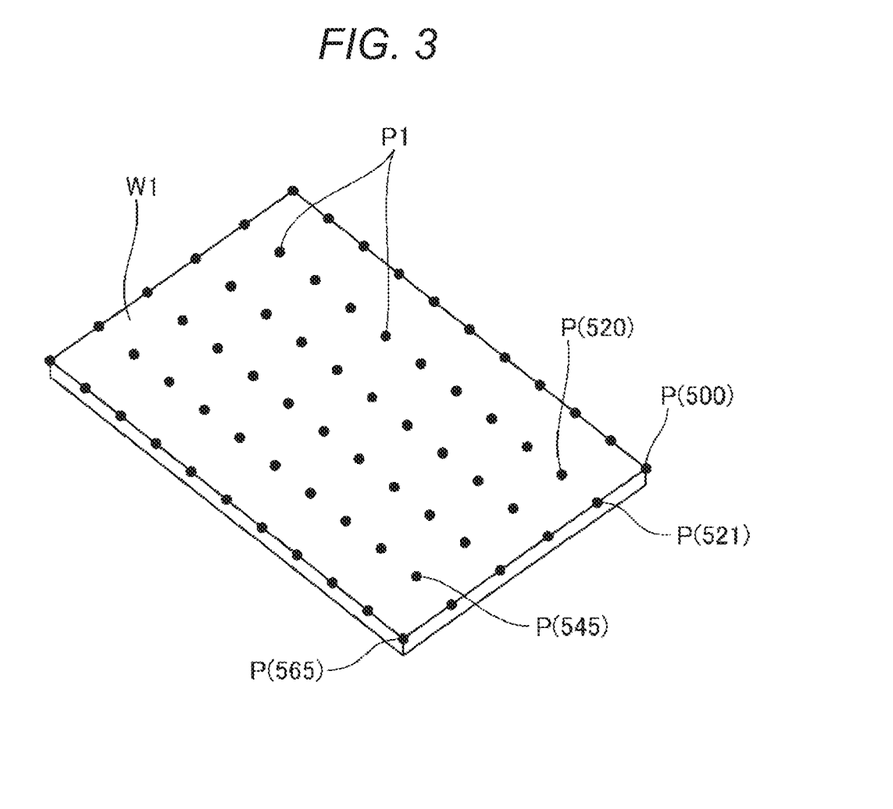
FIG. 3 is a diagram showing an example of a screen displayed on a display section provided to the robotic system shown in FIG. 1.
Figure 4:
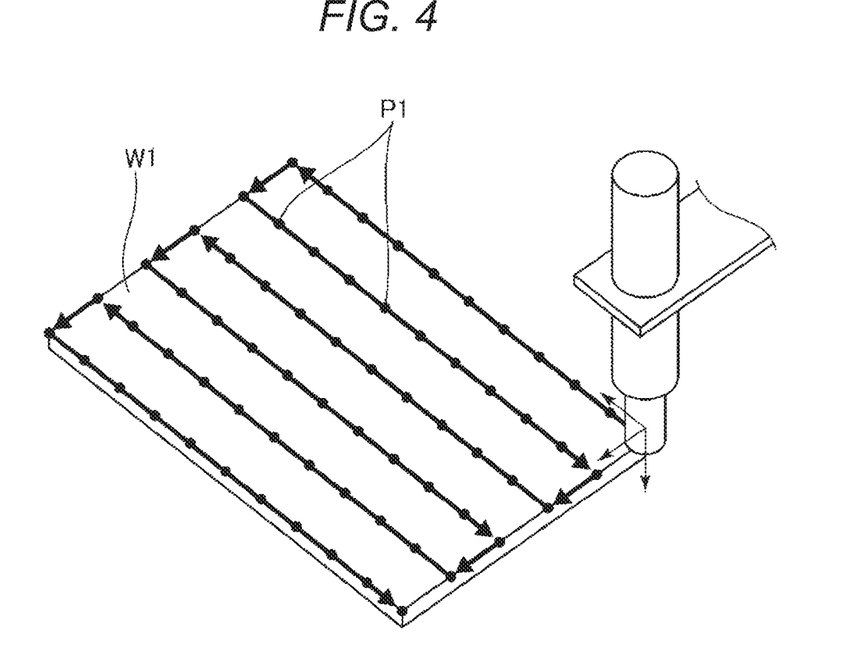
FIG. 4 is a diagram showing an example of a screen displayed on the display section provided to the robotic system shown in FIG. 1.
Figure 5:
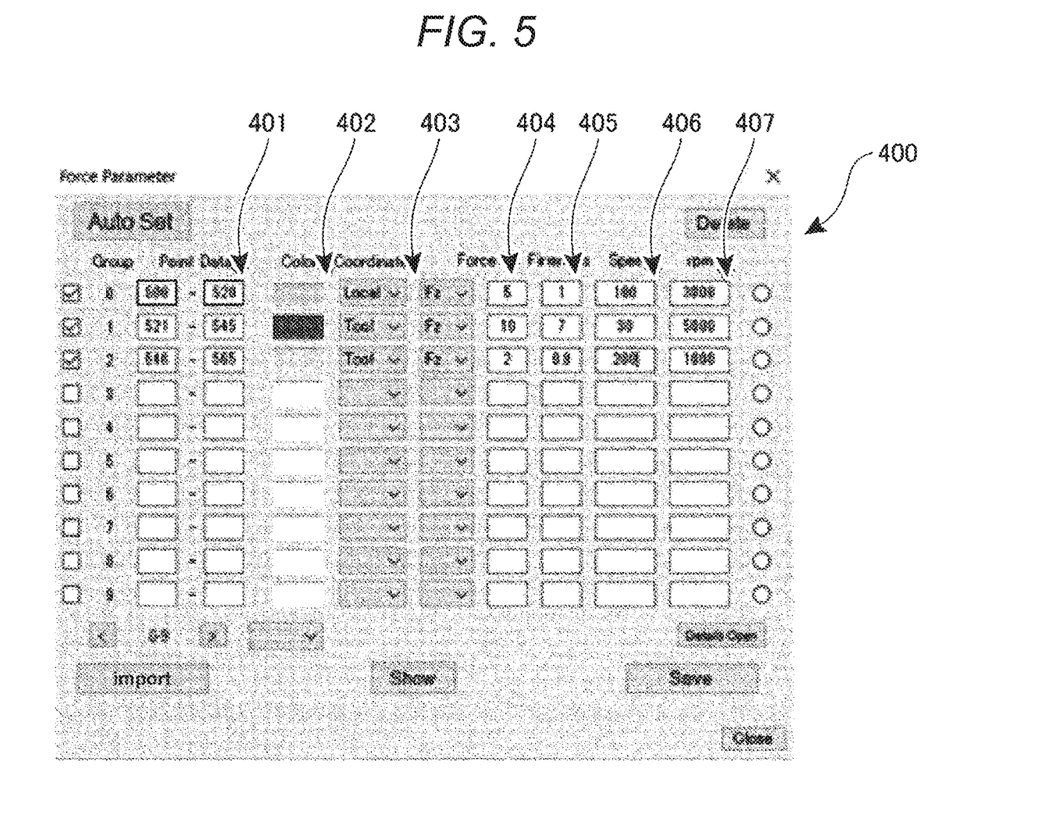
FIG. 5 is a diagram showing an example of a setup screen displayed on the display section provided to the robotic system shown in FIG. 1.
Figure 6:
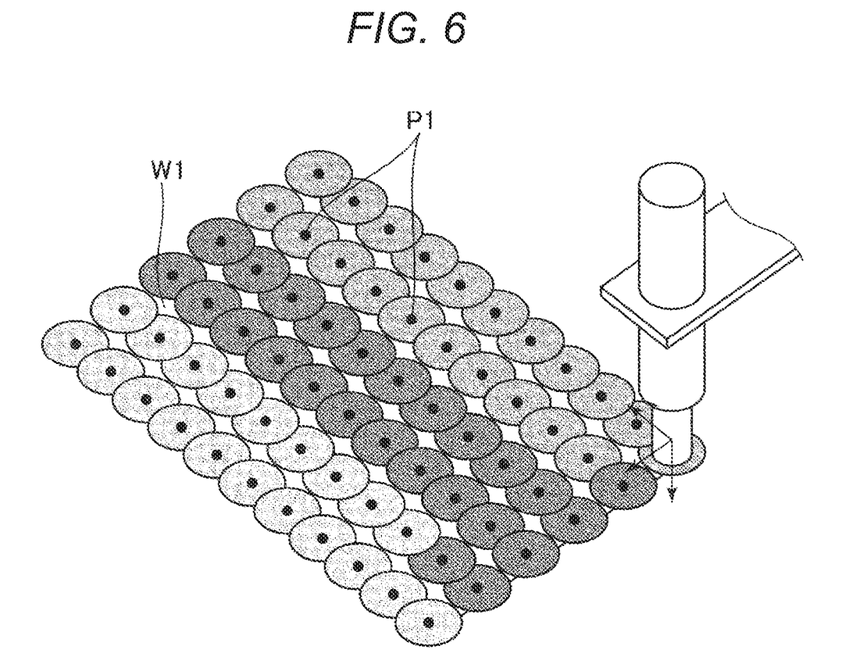
FIG. 6 is a diagram showing an example of a screen displayed on the display section provided to the robotic system shown in FIG. 1.
Figure 7:
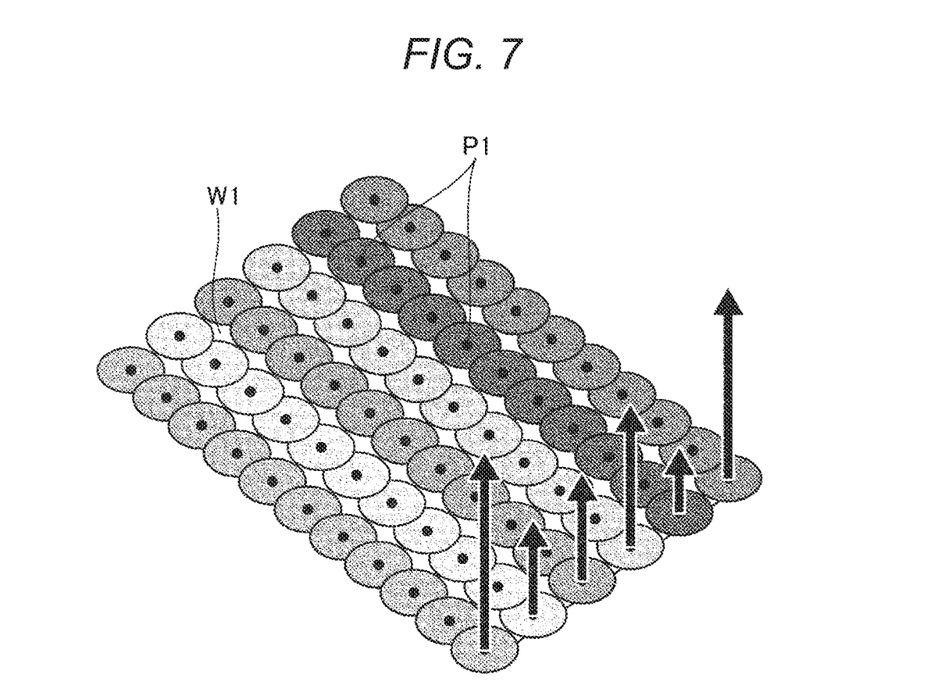
FIG. 7 is a diagram showing an example of a screen displayed on the display section provided to the robotic system shown in FIG. 1.

FIG. 1 is a diagram showing an overall configuration of a robotic system equipped with a teaching support device according to the present disclosure. FIG. 2 is a block diagram of the robotic system shown in FIG. 1. FIG. 3 is a diagram showing an example of a screen displayed on a display section provided to the robotic system shown in FIG. 1. FIG. 4 is a diagram showing an example of a screen displayed on a display section provided to the robotic system shown in FIG. 1. FIG. 5 is a diagram showing an example of a setup screen displayed on a display section provided to the robotic system shown in FIG. 1. FIG. 6 is a diagram showing an example of a screen displayed on a display section provided to the robotic system shown in FIG. 1. FIG. 7 is a diagram showing an example of a screen displayed on a display section provided to the robotic system shown in FIG. 1.

The teaching support device according to the present disclosure will hereinafter be described in detail based on a preferred embodiment shown in the accompanying drawings. It should be noted that hereinafter a +Z-axis direction, namely an upper side in FIG. 1, is referred to as an "upper side," and a −Z-axis direction, namely a lower side thereof, is referred to as a "lower side" for the sake of convenience of explanation. Further, regarding the robot arm, a platform 11 side in FIG. 1 is referred to as a "base end," and an opposite side, namely an end effector side, is referred to as a "tip." Further, the Z-axis direction, namely an up-down direction in FIG. 1, is defined as a "vertical direction," and the X-axis direction and the Y-axis direction, namely a right-left direction and a front-back direction, are defined as a "horizontal direction."

As shown in FIG. 1, the robotic system 100 is provided with a robot 1, a control device 3 for controlling the robot 1, and a teaching device 4. Further, the teaching device 4 incorporates a teaching support device 10A.

First, the robot 1 will be described.

The robot 1 shown in FIG. 1 is a single-arm six-axis vertical articulated robot in the present embodiment, and has a platform 11 and a robot arm 10. Further, it is possible to mount an end effector 20 on a tip portion of the robot arm 10. The end effector 20 can be a constituent element of the robot 1, or is not required to be a constituent element of the robot 1.

It should be noted that the robot 1 is not limited to the illustrated configuration, and can be, for example, a double-arm articulated robot. Further, the robot 1 can be a horizontal articulated robot.

The platform 11 is a support body for supporting the robot arm 10 from a lower side so as to be able to drive the robot arm 10, and is fixed to, for example, a floor in a factory. In the robot 1, the platform 11 is electrically coupled to the control device 3 via a relay cable 18. It should be noted that the coupling between the robot 1 and the control device 3 is not limited to the coupling with wire as in the configuration shown in FIG. 1, but can be, for example, coupling without wire, or can also be connection via a network such as the Internet.

In the present embodiment, the robot arm 10 has a first arm 12, a second arm 13, a third arm 14, a fourth arm 15, a fifth arm 16, and a sixth arm 17, wherein these arms are coupled to one another in this order from the platform 11 side. It should be noted that the number of the arms provided to the robot arm 10 is not limited to six, and can be, for example, one, two, three, four, five, or seven or more. Further, a size such as a total length of each of the arms is not particularly limited, and can arbitrarily be set.

The platform 11 and the first arm 12 are coupled to each other via a joint 171. Further, the first arm 12 is arranged to be able to rotate around a first rotational axis parallel to the vertical direction with respect to the platform 11 taking the first rotational axis as a rotational center. The first rotational axis coincides with a normal line of the floor to which the platform 11 is fixed.

The first arm 12 and the second arm 13 are coupled to each other via a joint 172. Further, the second arm 13 is arranged to be able to rotate with respect to the first arm 12 taking a second rotational axis parallel to the horizontal direction as a rotational center. The second rotational axis is parallel to an axis perpendicular to the first rotational axis.

The second arm 13 and the third arm 14 are coupled to each other via a joint 173. Further, the third arm 14 is arranged to be able to rotate with respect to the second arm 13 taking a third rotational axis parallel to the horizontal direction as a rotational center. The third rotational axis is parallel to the second rotational axis.

The third arm 14 and the fourth arm 15 are coupled to each other via a joint 174. Further, the fourth arm 15 is arranged to be able to rotate with respect to the third arm 14 taking a fourth rotational axis parallel to a central axis of the third arm 14 as a rotational center. The fourth rotational axis is perpendicular to the third rotational axis.

The fourth arm 15 and the fifth arm 16 are coupled to each other via a joint 175. Further, the fifth arm 16 is arranged to be able to rotate with respect to the fourth arm 15 taking a fifth rotational axis as a rotational center. The fifth rotational axis is perpendicular to the fourth rotational axis.

The fifth arm 16 and the sixth arm 17 are coupled to each other via a joint 176. Further, the sixth arm 17 is arranged to be able to rotate with respect to the fifth arm 16 taking a sixth rotational axis as a rotational center. The sixth rotational axis is perpendicular to the fifth rotational axis.

Further, the sixth arm 17 forms a robot tip portion located at the farthest to the tip side in the robot arm 10. The sixth arm 17 can rotate together with the end effector 20 due to the drive of the robot arm 10.

The robot 1 is provided with a motor M1, a motor M2, a motor M3, a motor M4, a motor M5, and a motor M6 as a drive section, an encoder E1, an encoder E2, an encoder E3, an encoder E4, an encoder E5, and an encoder E6. The motor M1 is incorporated in the joint 171, and rotates the platform 11 and the first arm 12 relatively to each other. The motor M2 is incorporated in the joint 172, and rotates the first arm 12 and the second arm 13 relatively to each other. The motor M3 is incorporated in the joint 173, and rotates the second arm 13 and the third arm 14 relatively to each other. The motor M4 is incorporated in the joint 174, and rotates the third arm 14 and the fourth arm 15 relatively to each other. The motor M5 is incorporated in the joint 175, and rotates the fourth arm 15 and the fifth arm 16 relatively to each other. The motor M6 is incorporated in the joint 176, and rotates the fifth arm 16 and the sixth arm 17 relatively to each other.

Further, the encoder E1 is incorporated in the joint 171, and detects a position of the motor M1. The encoder E2 is incorporated in the joint 172, and detects a position of the motor M2. The encoder E3 is incorporated in the joint 173, and detects a position of the motor M3. The encoder E4 is incorporated in the joint 174, and detects a position of the motor M4. The encoder E5 is incorporated in the joint 175, and detects a position of the motor M5. The encoder E6 is incorporated in the joint 176, and detects a position of the motor M6.

The encoders E1 through the encoder E6 are electrically coupled to the control device 3, and positional information, namely an amount of rotation, of each of the motor M1 through the motor M6 is transmitted to the control device 3 as an electric signal. Further, based on this information, the control device 3 drives the motor M1 through the motor M6 via a driver not shown. In other words, controlling the robot arm 10 is controlling the motor M1 through the motor M6.

Further, at the tip of the robot arm 10, there is set a control point CP. The control point CP means a point acting as a reference when performing the control of the robot arm 10. In the robotic system 100, a position of the control point CP is figured out in a robotic coordinate system, and the robot arm 10 is driven so that the control point CP moves to a desired position.

Further, in the robot 1, the robot arm 10 is provided with a force detection section 19 for detecting the force in a detachable manner. Further, the robot arm 10 can be driven in a state in which the force detection section 19 is provided. The force detection section 19 is a six-axis kinesthetic sensor in the present embodiment. The force detection section 19 detects magnitudes of forces on three detection axes perpendicular to each other, and magnitudes of torques around the respective three detection axes. Specifically, the force detection section 19 detects force components in the respective axial directions of an X axis, a Y axis, and a Z axis perpendicular to each other, a force component in a Tx direction around the X axis, a force component in a Ty direction around the Y axis, and a force component in a Tz direction around the Z axis. It should be noted that in the present embodiment, the Z-axis direction corresponds to a vertical direction. Further, the force component in each of the axial directions can be referred to as a "translational force component," and the force component around each of the axes can be referred to as a "rotational force component." Further, the force detection section 19 is not limited to the six-axis kinesthetic sensor, and can be one having another configuration.

In the present embodiment, the force detection section 19 is provided to the sixth arm 17. It should be noted that the installation place of the force detection section 19 is not limited to the sixth arm 17, namely the arm located at the farthest to the tip side, and can be, for example, another arm, an area between the arms adjacent to each other, or a place below the platform 11, or it is possible to provide the force detection section 19 to each of the joints.

It is possible to detachably mount the end effector 20 on the force detection section 19. In the present embodiment, the end effector 20 is formed of a polishing tool for performing polishing. The end effector 20 has a grinder at the tip, and polishes a work W1 with the grinder making contact with the work W1 while rotating. It should be noted that although the grinder is used as the polishing tool in the present embodiment, this is not a limitation, and it is possible to adopt a sponge or what is obtained by making abrasive grains adhere to paper, cloth, or a film.

Further, in the robotic coordinate system, a tool center point TCP is set at an arbitrary position at the tip of the end effector 20, preferably at a tip of the grinder. As described above, in the robotic system 100, the position of the control point CP is figured out in the robotic coordinate system, and the robot arm 10 is driven so that the control point CP moves to the desired position. Further, by figuring out a type, in particular a length, of the end effector 20 in advance, it is possible to figure out an amount of an offset between the tool center point TCP and the control point CP. Therefore, it is possible to figure out the position of the tool center point TCP in the robotic coordinate system. Therefore, it is possible to use the tool center point TCP as a reference of the control.

The work W1 is an object of the polishing by the end effector 20. In the surface of the work W1, an area to be polished corresponds to a polishing area. As the work W1, there can be cited a connector of electronic equipment, plastic exterior equipment, metal exterior equipment, and so on.

Then, the control device 3 will be described.

The control device 3 is arranged at a distance from the robot 1, and can be constituted by a computer incorporating a CPU (Central Processing Unit) as an example of a processor, and so on. The control device 3 can be incorporated in the platform 11 of the robot 1.

The control device 3 is coupled to the robot 1 with the relay cable 18 so as to be able to communicate with each other. Further, the control device 3 is coupled to the teaching device 4 so as to be able to communicate with each other wirelessly or with a cable. The teaching device 4 can be a dedicated computer, or can also be a general-purpose computer in which a program for teaching the robot 1 is installed. It is possible to use, for example, a teaching pendant as a dedicated device for teaching the robot 1 instead of the teaching device 4. Further, it is possible for the control device 3 and the teaching device 4 to be provided with respective chassis separated from each other, or to be configured integrally with each other.

Further, a program for generating an execution program which uses a target positional posture $S_t$ and a target force $f_{St}$ described later as parameters, and then loading the execution program to the control device 3 can be installed in the control device 3. The teaching device 4 is provided with a display, a processor, a RAM, and a ROM, and these hardware resources generate the execution program in cooperation with the teaching program.

As shown in FIG. 2, the control device 3 is a computer in which the control program for performing the control of the robot 1 is installed. The control device 3 is provided with a processor, and a RAM and a ROM not shown, and these hardware resources cooperate with a program to thereby control the robot 1.

Further, as shown in FIG. 2, the control device 3 has a target position setting section 3A, a drive control section 3B, and a storage section 3C. The storage section 3C is constituted by, for example, a volatile memory such as a RAM (Random Access Memory), a nonvolatile memory such as a ROM (Read Only Memory), and a removable external storage device. In the storage section 3C, there are stored an operation program for making the robot 1 operate, and so on.

The target position setting section 3A sets the target positional posture $S_t$ and an operation path for executing a predetermined operation on the work W1. The target position setting section 3A sets the target positional posture $S_t$ and the operation path based on the teaching information input from the teaching device 4.

The drive control section 3B is for controlling the drive of the robot arm 10, and has a position control section 30, a coordinate conversion section 31, a coordinate conversion section 32, a correction section 33, a force control section 34, and a command integration section 35.

The position control section 30 generates a position command signal for controlling a position of the tool center point TCP of the robot 1, namely a position command value, based on the target position designated using a command created in advance.

Here, the control device 3 is capable of controlling the operation of the robot 1 using force control and so on. The "force control" means control of an operation of the robot 1 of changing a position of the end effector 20, namely a position of the tool center point TCP, and postures of the first arm 12 through the sixth arm 17 based on the detection result of the force detection section 19.

The force control includes, for example, force trigger control and impedance control. In the force trigger control, the force detection is performed by the force detection section 19, and the robot arm 10 is made to perform an operation such as a displacement or a change in posture until a predetermined force is detected by the force detection section 19.

The impedance control includes imitation control. In the impedance control, the operation of the robot arm 10 is controlled so as to keep the force applied to the tip portion of the robot arm 10 to a predetermined force as precisely as possible, namely so as to keep the force in a predetermined direction detected by the force detection section 19 at the target force $f_{St}$ as precisely as possible. Thus, for example, when the impedance control is performed on the robot arm 10, the robot arm 10 performs an operation imitating an external force applied from the object or an operator with respect to the predetermined direction. It should be noted that the target force $f_{St}$ includes 0. For example, as one of the settings when performing the imitation operation, it is possible to set the target value to "0." It should be noted that it is possible to set the target force $f_{St}$ to a numerical value other than 0. It is possible for the operator to arbitrarily sect the target force $f_{St}$ via, for example, the teaching device 4. Further, it is possible to set the target force $f_{St}$ for each of the directions (X, Y, and Z) of the axes, and each of the directions (Tx, Ty, and Tz) around the respective axes.

The storage section 3C stores a correspondence relationship between a combination of rotational angles of the motor M1 through the motor M6, and a position of the tool center point TCP in the robotic coordinate system. Further, the control device 3 stores at least one of the target positional posture $S_t$ and the target force $f_{St}$ in the storage section 3C based on a command in every step of an operation performed by the robot 1. The command using the target positional posture $S_t$ and the target force $f_{St}$ as parameters is set for every step of the operation performed by the robot 1.

The drive control section 3B controls the first arm 12 through the sixth arm 17 so that the target positional posture $S_t$ and the target force $f_{St}$ thus set are achieved at the tool center point TCP. The target force $f_{St}$ means a detected force and a torque of the force detection section 19 to be achieved by actions of the first arm 12 through the sixth arm 17. Here, the character "S" is assumed to represent any one of the directions (X, Y, and Z) of the axes defining the robotic coordinate system. Further, it is also assumed that the character S also represents a position in the S direction. For example, in the case of S=X, the X direction component of the target position set in the robotic coordinate system becomes $S_t=X_t$, and the X direction component of the target force becomes $f_{St}=f_{Xt}$.

Further, in the drive control section 3B, when the rotational angles of the motor M1 through the motor M6 are obtained, the coordinate conversion section 31 shown in FIG. 2 converts the rotational angles into the positional posture S at the tool center point TCP in the robotic coordinate system based on the correspondence relationship. Then, the coordinate conversion section 32 identifies an acting force $f_S$ actually acting on the force detection section 19 in the robotic coordinate system based on the positional posture S of the tool center point TCP and the detection value of the force detection section 19.

An acting point of the acting force $f_S$ is defined as a force detection origin separately from the tool center point TCP. The force detection origin corresponds to a point at which the force detection section 19 is detecting a force. It should be noted that the control device 3 stores a correspondence relationship which defines a direction of a detection axis in a sensor coordinate system of the force detection section 19 for every positional posture S of the tool center point TCP in the robotic coordinate system. Therefore, it is possible for the control device 3 to identify the acting force $f_S$ in the robotic coordinate system based on the positional posture S of the tool center point TCP in the robotic coordinate system and the correspondence relationship. Further, the torque acting on the robot 1 can be calculated from the acting force $f_S$ and a distance from the contact point to the force detection section 19, and is identified as a torque component. It should be noted that when the end effector 20 makes contact with the work W1 to perform an operation, the contact point can be assumed as the tool center point TCP.

The correction section 33 performs a gravity compensation on the acting force $f_S$. The gravity compensation means elimination of a component of a force or a torque caused by the gravity from the acting force $f_S$. The acting force $f_S$ on which the gravity compensation has been performed can be assumed as a force other than the gravity acting on the robot arm 10 or the end effector 20.

Further, the correction section 33 performs an inertia compensation on the acting force $f_S$. The inertia compensation means elimination of a component of a force or a torque caused by an inertial force from the acting force $f_S$. The acting force $f_S$ on which the inertia compensation has been performed can be assumed as a force other than the inertial force acting on the robot arm 10 or the end effector 20.

The force control section 34 performs the impedance control. The impedance control is active impedance control which realizes an imaginary mechanical impedance with the motor M1 through the motor M6. The control device 3 performs such impedance control when performing direct teaching and a step in a contact state in which the end effector 20 receives a force from the object such as a fitting task, a screwing task, or a polishing task. It should be noted that besides such a step, by performing the impedance control when, for example, a human makes contact with the robot 1, it is possible to enhance the safety.

In the impedance control, the target force $f_{St}$ is substituted into a motion equation described later to derive the rotational angles of the motor M1 through the motor M6. Signals with which the control device 3 controls the motor M1 through the motor M6 are each a signal modulated with PWM (Pulse Width Modulation).

Further, in a step in a non-contact state in which the end effector 20 does not receive an external force, the control device 3 controls the motor M1 through the motor M6 with the rotational angles derived by a linear operation from the target positional posture $S_t$. A mode in which the motor M1 through the motor M6 are controlled with the rotational angles derived by the linear operation from the target positional posture $S_t$ is referred to as a position control mode.

The control device 3 substitutes the target force $f_{St}$ and the acting force $f_S$ into the motion equation of the impedance control to thereby identify a force-derived correction value $\Delta S$. The force-derived correction value $\Delta S$ means a magnitude of the positional posture S which the tool center point TCP should move for dissolving a force deviation $\Delta f_S(t)$ from the target force $f_{St}$ when the tool center point TCP has received the mechanical impedance. The following formula (1) is the motion equation of the impedance control.

$$m\Delta\ddot{S}(t)+d\Delta\dot{S}(t)+k\Delta S(t)=\Delta f_S(t) \qquad (1)$$

The left-hand side of the formula (1) is constituted by a first term in which a second order differential value of the positional posture S of the tool center point TCP is multiplied by a virtual mass coefficient m (hereinafter referred to as a "mass coefficient m"), a second term in which a differential value of the positional posture S of the tool center point TCP is multiplied by a virtual viscosity coefficient d (hereinafter referred to as a "viscosity coefficient d"), and a third term in which the positional posture S of the tool center point TCP is multiplied by a virtual elastic coefficient k (hereinafter referred to as an "elastic coefficient k"). The right-hand side of the formula (1) is formed of the force deviation $\Delta f_S(t)$ obtained by subtracting the actual force f from the target force $f_{St}$. The differential in formula (1) means the temporal differentiation. In the step performed by the robot, a constant value is set as the target force $f_{St}$ in some cases, and a function of time is set as the target force $f_{St}$ in some cases.

The mass coefficient m means a mass which the tool center point TCP virtually has, the viscosity coefficient d means a viscosity resistance which the tool center point TCP virtually receives, and the elastic coefficient k means a spring constant of the elastic force which the tool center point TCP virtually receives.

As the value of the mass coefficient m increases, the acceleration of the action decreases, and as the value of the mass coefficient m decreases, the acceleration of the action increases. As the value of the viscosity coefficient d increases, the speed of the action decreases, and as the value of the viscosity coefficient d decreases, the speed of the action increases. As the value of the elastic coefficient k increases, the elasticity increases, and as the value of the elastic coefficient k decreases, the elasticity decreases.

The mass coefficient m, the viscosity coefficient d, and the elastic coefficient k can each be set to values different by direction, or can each also be set to a common value irrespective of the direction. Further, it is possible for the operator to arbitrarily set the mass coefficient m, the viscosity coefficient d, and the elastic coefficient k prior to the operation. The input is performed by the operator using, for example, the teaching device 4.

The mass coefficient m, the viscosity coefficient d, and the elastic coefficient k described above are each a force control parameter. The force control parameter is a value set in advance of the robot arm 10 actually performing an operation. The force control parameters include the mass coefficient m, the viscosity coefficient d, the elastic coefficient k, and so on.

As described above, in the robot system 100, during the execution of the force control, the correction value is obtained from the detection value of the force detection section 19, the force control parameters set in advance, and the target force set in advance. This correction value means the force-derived correction value ΔS described above, and means a difference between the position at which the external force is received, and a position to which the tool center point TCP should be moved.

Further, the command integration section 35 combines the force-derived correction value ΔS with a position command value P generated by the position control section 30. By performing the above as needed, the command integration section 35 obtains a new position command value P' from the position command value P which has been used for the displacement to the position at which the external force is received.

Then, by the coordinate conversion section 31 converting the new position command value P' into the robotic coordinate and then an execution section 351 executing the operation, it is possible to move the tool center point TCP to the position reflecting the force-derived correction value ΔS to thereby respond to the external force, and thus relax the further load applied to the object which has made contact with the robot 1.

According to such a drive control section 3B, it is possible to perform the polishing task in good condition while applying desired pressure by performing the force control while pressing the end effector 20 against the work W1.

Then, the teaching device 4 will be described.

As shown in FIG. 2, the teaching device 4 is a device for receiving a variety of setups, generating an operation program, and generating and then displaying such images as shown in FIG. 3 through FIG. 7. The teaching device 4 has a display section 40, a control section 41, a storage section 42, and a communication section 43. The teaching device 4 is a laptop personal computer in the illustrated configuration, but is not particularly limited thereto in the present disclosure, and can be, for example, a desktop personal computer, a tablet, or a smartphone.

As shown in FIG. 5, the display section 40 displays a setup screen 400 for the operator to input a variety of types of information, a simulation image for displaying information taught, and so on. As the variety of types of information described above, there can be cited information related to teaching points P1, information related to a polishing parameter of the polishing task, information related to the force control parameters described above, and so on.

The control section 41 has at least one processor. As the processor, there can be cited, for example, a CPU (Central Processing Unit) and a GPU (Graphics Processing Unit). The control section 41 reads out a variety of programs and so on stored in the storage section 42, and then executes the programs. As the variety of programs, there can be cited, for example, an operation program and a teaching program of the robot arm 10. These programs can be those generated by the teaching device 4, or can be those stored from an external recording medium such as a CD-ROM, or can be those stored via a network.

The teaching program generated by the control section 41 is transmitted to the control device 3 of the robot 1 via the communication section 43. Thus, it is possible for the robot arm 10 to execute a predetermined task in a predetermined condition.

Further, the control section 41 has a teaching point acquisition section 411, a polishing parameter acquisition section 412, a color information acquisition section 413, and a display control section 414. The teaching point acquisition section 411, the polishing parameter acquisition section 412, the color information acquisition section 413, and the display control section 414 constitute the teaching support device 10A.

The teaching point acquisition section 411 obtains the information related to the teaching points P1 input by the operator using the setup screen 400 shown in FIG. 5. As shown in FIG. 3, the teaching points P1 are points which are arranged on the surface of the work W1, and through which the tool center point TCP should pass. In the illustrated configuration, the teaching points P1 are arranged in a reticular pattern, and information related to a passing order is made to associate with each of the teaching points P1. Thus, it is possible to set such a path as shown in FIG. 4. It should be noted that the position information of the teaching points P1 with respect to the work W1 is represented in, for example, the robotic coordinate system.

The polishing parameter acquisition section 412 obtains the information related to the polishing parameters input by the operator using the setup screen 400 shown in FIG. 5. As the polishing parameters, there can be cited, for example, information related to the polishing tool, information related to a material of the abrasive grain of the grinder, information related to a size of the abrasive grain, information related to rotational speed of the grinder, and information related to pressing force. In the illustrated configuration, there is displayed the pressing force.

The color information acquisition section 413 obtains color information input by the operator using the setup screen 400 shown in FIG. 5.

The display control section 414 displays arbitrary teaching points P1 out of the plurality of teaching points P1 with a color based on the polishing parameters obtained by the polishing parameter acquisition section 412 so as to be superimposed on the work W1. In other words, the arbitrary teaching point P1 out of the plurality of teaching points P1 are displayed with the color based on the polishing parameters obtained. This point will be described later in detail.

The storage section 42 stores a variety of types of setup information, and a variety of programs which can be executed by the control section 41. As the storage section 42, there can be cited, for example, a volatile memory such as a RAM (Random Access Memory), a nonvolatile memory such as a ROM (Read Only Memory), and a removable external storage device.

The communication section 43 performs transmission/reception of signals with the control device 3 using an external interface such as a wired LAN (Local Area Network), or a wireless LAN.

The display section 40 is formed of a variety of types of display having a display screen. In the present embodiment, by operating an input operation section such as a mouse or a keyboard, it is possible for the operator to input a variety of setups. It should be noted that this configuration is not a limitation, and it is possible to adopt a configuration in which the display section 40 is provided with a display function and an input operation function such as a touch panel. Further, it is possible to adopt a configuration in which the touch panel, the mouse, and the keyboard are used together with each other.

It should be noted that the display section 40 is not limited to the illustrated configuration, and it is possible to adopt one having a configuration of, for example, forming an image on the object or in the air.

Then, the setup screen 400 shown in FIG. 5 will be described. The setup screen 400 is a screen to be displayed on the display section 40, and it is possible for the operator to perform the teaching by inputting each item. Specifically, the setup screen 400 has an input section 401, an input section 402, an input section 403, an input section 404, an input section 405, an input section 406, and an input section 407.

The input section 401 is a portion in which the numbers of the teaching points P1 are input to set the numbers of the teaching points P1 in a plurality of ranges. Further, it is possible to set the items alone in each of the ranges using the input section 402 through the input section 407 described below.

The input section 402 is a portion in which the color to be displayed is set for each of the ranges of the teaching points P1 designated in the input section 401. Specifically, the input section 402 is a portion in which a color is selectively input at the right side of the range of the teaching points P1 designated in the input section 401.

The input section 403 is a portion in which a type of a coordinate system is input for each of the ranges of the teaching points P1 designated in the input section 401. As the types of the coordinate system, there are cited a local coordinate system, an end coordinate system, a robotic coordinate system, and so on.

The input section 404 is a portion in which a direction and a magnitude of the pressing force of the grinder when performing the polishing task are input for each of the ranges of the teaching points P1 designated in the input section 401. As the directions of the pressing force, there are cited Fx, Fy, and Fz, and the direction of the pressing force can be set by selecting one from these. Further, the magnitude of the pressing force can be set by inputting a numerical value.

The input section 405 is a portion in which the viscosity coefficient as one of the force control parameters is input for each of the ranges of the teaching points P1 designated in the input section 401. It should be noted that this configuration is not a limitation, and it is possible to adopt a configuration of, for example, inputting the mass coordinate, or the elastic coordinate, or two or more of these parameters.

The input section 406 is a portion in which the moving speed of the tool center point TCP is set for each of the ranges of the teaching points P1 designated in the input section 401. It is possible to set the moving speed by inputting a numerical value.

The input section 407 is a portion in which the rotational speed of the grinder of the polishing tool is set for each of the ranges of the teaching points P1 designated in the input section 401. It is possible to set the rotational speed of the grinder by inputting a numerical value.

When performing the setup using such a setup screen 400, such a simulation image as shown in FIG. 6 is displayed. In the simulation image shown in FIG. 6, there are displayed the work W1, and the teaching points P1 set on the work W1. Further, the teaching points P1 are displayed with colors based on the polishing parameters obtained by the polishing parameter acquisition section 412 so as to overlap the work W1. Thus, it is possible for the operator to figure out the contents of the teaching information input by him- or herself at a glance. In particular, by displaying the teaching points P1 attached with colors, what contents the teaching information has can clearly be figured out.

As described above, the teaching support device 10A is a device for performing teaching to the robot 1 which has the robot arm 10 the tip of which is attached with the end effector 20 as the polishing tool, and which controls the robot arm 10 with the force control to perform the polishing task on the work W1 as the object, and is provided with the teaching point acquisition section 411 for obtaining the information related to the plurality of teaching points P1 set on the work W1, the polishing parameter acquisition section 412 for obtaining the information related to the polishing parameters of the polishing task at the plurality of teaching points P1 obtained by the teaching point acquisition section 411, and the display control section 414 for displaying the teaching points P1 with the colors based on the polishing parameters obtained by the polishing parameter acquisition section 412 so as to overlap the work W1. Thus, it is possible for the operator to figure out the contents of the teaching information input by him- or herself at a glance. In particular, by displaying the teaching points P1 attached with colors, what contents the teaching information has can clearly be figured out.

Further, the display control section 414 displays the teaching point P1 with a first color when the polishing parameter thus obtained is in a first range, for example, the pressing force is in a range no lower than 4 N and no higher than 6 N, and displays an arbitrary teaching point P1 with a second color different from the first color when the polishing parameter thus received is in a second range different from the first range, for example, the pressing force is in a range no lower than 7 N and no higher than 10 N. Thus, it is possible for the operator to more clearly figure out the contents of the teaching information input by him- or herself at a glance.

Further, the display control section 414 displays a circle including the teaching point P1. Thus, it is possible for the operator to more clearly figure out the contents of the teaching information input by him- or herself at a glance. It should be noted that this configuration is not a limitation, and it is possible to adopt any configurations such as a triangular shape, a quadrangular shape, a polygonal shape having larger number of vertexes, or a shape of a star.

Further, the polishing parameters include the information of the size of the grinder provided to the polishing tool, and the display control section 414 displays a circle different in side by the information of the size of the grinder. Specifically, the larger the size of the grinder is, the larger the circle to be displayed is made, and the smaller the size of the grinder is, the smaller the circle to be displayed is made. Thus, it is possible to figure out the size of the grinder provided to the polishing tool at a glance. Further, it is possible to figure out the area to actually be polished.

Further, there is provided the color information acquisition section 413 for obtaining the information of setting the color. Thus, it is possible to set the color to be displayed.

Further, it is possible to adopt a configuration in which the color information acquisition section 413 obtains the number of colors to be set and the ranges of the polishing parameters, and the display control section 414 displays the colors based on the number of colors and the ranges of the polishing parameters obtained by the color information acquisition section 413. Specifically, it is possible to adopt a configuration in which the display colors are automatically assigned so that an area high in pressing force becomes, for example, red, and an area low in pressing force becomes, for example, green in accordance with the magnitude of the pressing force thus input. Thus, the difference in magnitude of the pressing force can also be figured out at a glance.

Further, since the magnitude of the pressing force and the display color are associated with each other, it is possible to confirm a distribution of the pressing force.

It should be noted that it is possible to adopt a configuration of displaying arrows corresponding respectively to the colors displayed as shown in FIG. 7. In this case, it is preferable to display the arrows made different in color, width, length, and so on by the pressing force. Thus, the difference in magnitude of the pressing force can be figured out at a glance.

As described above, the display control section 414 displays the arrow including the teaching point P1. Thus, the difference in magnitude of the pressing force can be figured out at a glance.

Another Configuration Example of Robotic System

Figure 8:
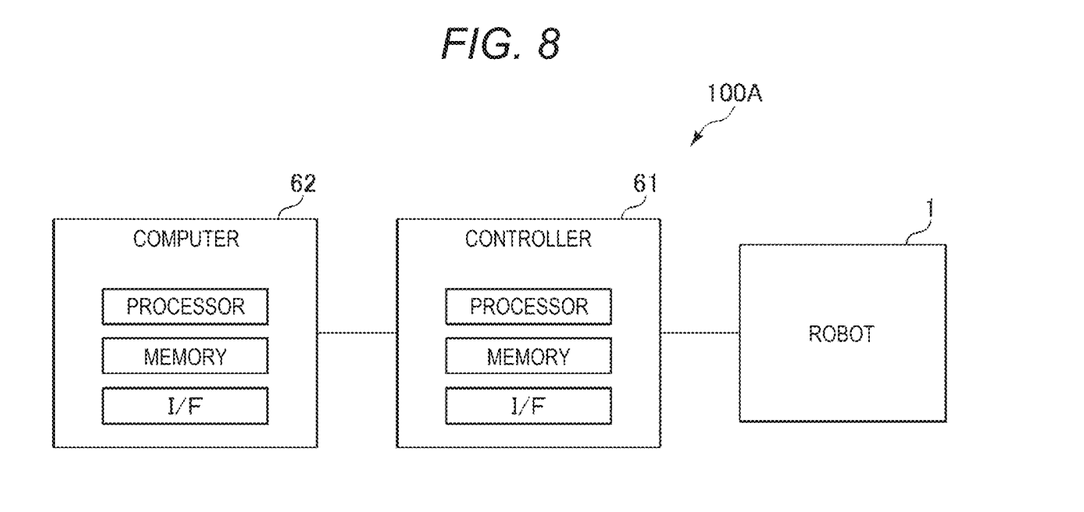
FIG. 8 is a block diagram for explaining a robotic system with a focus on hardware.

FIG. 8 is a block diagram for explaining a robotic system with a focus on hardware.

FIG. 8 shows an overall configuration of the robotic system 100A having the robot 1, a controller 61, and a computer 62 coupled to each other. The control of the robot 1 can be executed by reading out commands located in the memory with a processor located in the controller 61, or can be executed via the controller 61 by reading out the commands located in the memory with a processor located in the computer 62.

Therefore, it is possible to recognize either one or both of the controller 61 and the computer 62 as a "control device."

Modified Example 1

Figure 9:
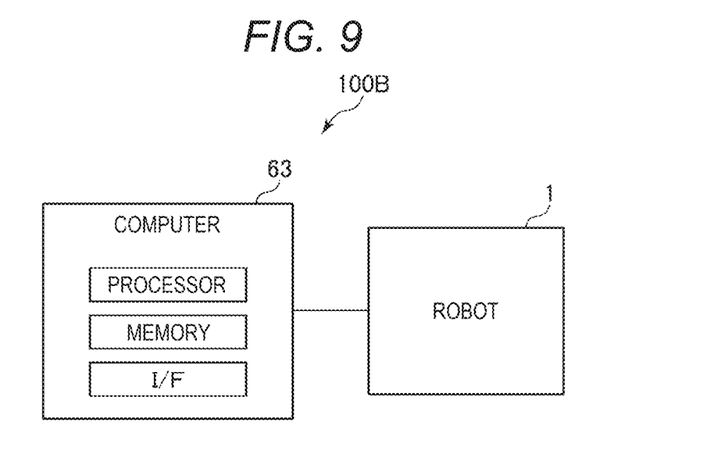
FIG. 9 is a block diagram showing Modified Example 1 with a focus on hardware of a robotic system.

FIG. 9 is a block diagram showing Modified Example 1 with a focus on hardware of a robotic system.

FIG. 9 shows an overall configuration of the robotic system 100B in which a computer 63 is directly coupled to the robot 1. The control of the robot 1 is directly executed by a processor located in the computer 63 reading out the commands located in the memory.

Therefore, it is possible to recognize the computer 63 as the "control device."

Modified Example 2

Figure 10:
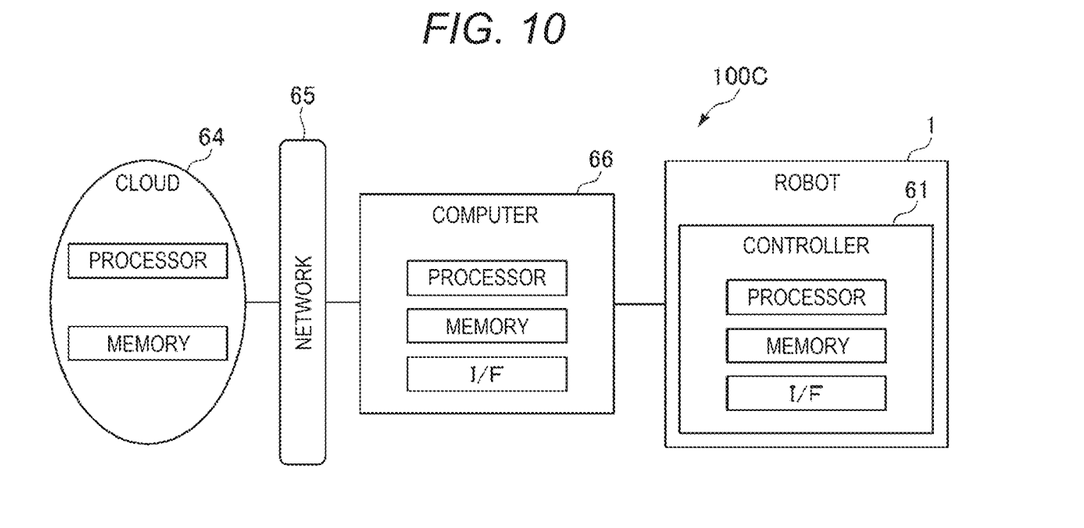
FIG. 10 is a block diagram showing Modified Example 2 with a focus on hardware of a robotic system.

FIG. 10 is a block diagram showing Modified Example 2 with a focus on hardware of a robotic system.

FIG. 10 shows an overall configuration of the robotic system 100C in which the robot 1 incorporating the controller 61 and a computer 66 are coupled to each other, and the computer 66 is connected to the cloud 64 via a network 65 such as LAN. The control of the robot 1 can be executed by reading out the commands located in the memory with a processor located in the computer 66, or can be executed by reading out the commands located in the memory via the computer 66 with a processor located on the cloud 64.

Therefore, it is possible to recognize any one, two, or three of the controller 61, the computer 66, and the cloud 64 as the "control device."

Although the teaching support device according to the present disclosure is described with reference to the illustrated embodiment, the present disclosure is not limited to the illustrated embodiment. Further, the constituents of the teaching support device can be replaced with those capable of exerting substantially the same functions, and having arbitrary configurations. Further, it is possible to add arbitrary constituents.

What is claimed is:

1. A teaching support device comprising:
   a memory configured to store a program; and
   a processor configured to execute the program so as to:
      perform teaching to a robot which has a robot arm, a tip of the robot arm being attached with a polishing tool;
      control the robot arm with force control to perform a polishing task on an object, a contact point of the polishing tool to the object being a tool center point;
      obtain information related to a plurality of teaching points set to a surface of the object, the tool center point of the polishing tool passing the plurality of teaching points during the polishing task;
      obtain information related to a polishing parameter of the polishing task at the plurality of teaching points, the information related to the polishing parameter including the polishing tool, a size of an abrasive grain of the polishing tool, a speed of the polishing tool, and a pressing force of the polishing tool to the object; and
   one teaching point of the plurality of teaching points with a color based on the polishing parameter so as to overlap the object.

2. The teaching support device according to claim 1, wherein
   the processor is further configured to display a first related teaching point of the plurality of teaching points with a first color when the polishing parameter is in a first range, and display a second related teaching point of the plurality of teaching points with a second color different from the first color when the polishing parameter is in a second range different from the first range.

3. The teaching support device according to claim 1, wherein
   the processor is further configured to display a circle including each of the plurality of teaching points.

4. The teaching support device according to claim 3, wherein
   the polishing parameter includes information of a size of a grinder provided to the polishing tool, and
   the processor is further configured to display the circle different in size by the information of the size of the grinder.

5. The teaching support device according to claim 1, wherein
   the processor is further configured to display an arrow indicating each of the plurality of teaching points.

6. The teaching support device according to claim 1, wherein
   the processor is further configured to obtain information of setting the color.

7. The teaching support device according to claim 6, wherein
   the processor is further configured to obtain a number of the colors and a range of the polishing parameter, and
   the processor is further configured to display the color based on the number of the colors and the range of the polishing parameter.

* * * * *